US008439455B2

(12) United States Patent
Hayashi et al.

(10) Patent No.: US 8,439,455 B2
(45) Date of Patent: May 14, 2013

(54) BRAKE CONTROL SYSTEM FOR VEHICLE

(75) Inventors: Kosei Hayashi, Saitama (JP); Shinji Ito, Saitama (JP); Masanobu Nagasaki, Shiga (JP); Naoki Murasawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 12/933,311

(22) PCT Filed: Feb. 16, 2009

(86) PCT No.: PCT/JP2009/000597
§ 371 (c)(1),
(2), (4) Date: Sep. 17, 2010

(87) PCT Pub. No.: WO2009/122644
PCT Pub. Date: Oct. 8, 2009

(65) Prior Publication Data
US 2011/0127829 A1 Jun. 2, 2011

(30) Foreign Application Priority Data
Mar. 31, 2008 (JP) .................. 2008-089077

(51) Int. Cl.
*B62D 61/02* (2006.01)
*B60T 8/36* (2006.01)

(52) U.S. Cl.
USPC ........................ 303/137; 303/119.3; 180/226

(58) Field of Classification Search .................. 303/9.64, 303/119.2, 119.3, 137, DIG. 10; 285/124.1, 285/124.2, 124.3, 124.4; 180/57, 226, 379
See application file for complete search history.

(56) References Cited

U.S. PATENT DOCUMENTS

| | | | | |
|---|---|---|---|---|
| 4,089,549 A | * | 5/1978 | Vyse et al. | 285/124.4 |
| 4,536,017 A | * | 8/1985 | Weirich et al. | 285/26 |
| 4,702,339 A | * | 10/1987 | Hayashi et al. | 180/219 |
| 5,476,162 A | | 12/1995 | Reed et al. | |
| 5,556,138 A | * | 9/1996 | Nakajima et al. | 285/124.4 |
| 5,820,167 A | * | 10/1998 | Linkner, Jr. | 285/124.1 |
| 5,951,059 A | * | 9/1999 | Kitamura | 285/24 |
| 6,176,338 B1 | * | 1/2001 | Nakagawa et al. | 180/219 |
| 6,478,103 B1 | | 11/2002 | Matsuura | |
| 7,249,644 B2 | * | 7/2007 | Honda et al. | 180/65.51 |

(Continued)

FOREIGN PATENT DOCUMENTS

| | | |
|---|---|---|
| EP | 1 679 243 A1 | 7/2006 |
| EP | 1 803 637 A1 | 7/2007 |

(Continued)

*Primary Examiner* — Robert A Siconolfi
*Assistant Examiner* — Stephen Bowes
(74) *Attorney, Agent, or Firm* — Carrier Blackman & Associates, P.C.; William D. Blackman; Joseph P. Carrier

(57) ABSTRACT

A brake control system that is received in a waterproof case and can be easily assembled even when a plurality of electric wires or hydraulic pipes is connected thereto is provided. A brake control system for a vehicle is connected to hydraulic brakes through a plurality of brake pipes 116a through 116e and controls hydraulic pressure of the hydraulic brakes, wherein the brake control system is received in a case 100 having a waterproof property, a pipe supporting member 101, which enables the plurality of the brake pipes 116a through 116e to be arranged from an external side of the case 100 into the case 100, is formed on the case 100, and the pipe supporting member 101 and the case 100 are detachably attached to each other through a seal member 102.

8 Claims, 12 Drawing Sheets

U.S. PATENT DOCUMENTS

| | | |
|---|---|---|
| 7,669,680 B2 | 3/2010 | Hasegawa |
| 7,708,098 B2 | 5/2010 | Toyoda |
| 2002/0171286 A1* | 11/2002 | Ohishi et al. ............... 303/119.2 |
| 2005/0134114 A1 | 6/2005 | Asahi |
| 2007/0145227 A1* | 6/2007 | Hasegawa .................... 248/637 |
| 2007/0222282 A1 | 9/2007 | Thurm et al. |

FOREIGN PATENT DOCUMENTS

| | | |
|---|---|---|
| EP | 1 826 086 A1 | 8/2007 |
| JP | 2-92375 U | 7/1990 |
| JP | 10-119558 A | 5/1998 |
| JP | 2007-176466 A | 7/2007 |

* cited by examiner

BRAKE CONTROL SYSTEM FOR VEHICLE

TECHNICAL FIELD

The present invention relates to a brake control system for a motorcycle and, more particularly, to a brake control system for an antilock brake system unit (hereinafter, referred to as "ABS unit").

BACKGROUND ART

In a related art, a motorcycle loaded with an ABS unit is known. As a brake control system for the ABS unit is a portion that is generally disposed under a seat or covered with a vehicle body cover, the brake control system is disposed at a location that is not well exposed to an external side. Meanwhile, for a motorcycle that is not provided with the vehicle body cover and is known as "American type motorcycle," the brake control system is disposed below a swing arm so that it is unseen (invisible) (for example, see Patent Document 1)
Patent Document 1: JP-A No. 2007-176466

DISCLOSURE OF THE INVENTION

Problem to be Solved by the Invention

When the brake control system is disposed below the swing arm, since the disposed location is low, it is possible that water may spatter onto the brake system by vehicle wheels during driving. Therefore, the brake control system may be received in a case. However, since a plurality of pipes is connected to the brake control system, it is troublesome to arrange the pipes through the waterproof case while ensuring the waterproof function.

The present invention has been made to address the above-mentioned problem, and an object of the present invention is to provide a brake control system for a vehicle that is designed to make it easy to arrange pipes even when the brake control system is received in a case and a plurality of electric wires or hydraulic pipes is connected to the brake control system.

Means of Solving the Problem

In order to address the above-mentioned problem, according to an embodiment of the present invention, there is provided a brake control system for a vehicle, which is connected to hydraulic brakes through a plurality of brake pipes and controls hydraulic pressure of hydraulic brakes, wherein the brake control system is received in a case, a pipe supporting member, which enables the plurality of the brake pipes to be arranged from an external side of the case into the case, is formed on the case, and the pipe supporting member and the case are detachably attached to each other through a seal member.

According to this structure, supporting portions of the pipes and the case can be sealed when arranging the plurality of the pipes from the external side of the case into the case.

In addition, the pipe supporting member may detachably connect the brake pipe disposed inside the case and the brake pipe disposed outside the case.

According to this structure, the brake pipe disposed outside the case can be connected to the pipe supporting member when the case is mounted on the vehicle boy in a state where the brake pipe disposed inside the case is connected to the pipe supporting member in advance.

Further, the case may include a plurality of parts and the pipe supporting member may be disposed to be fitted to a matching plane of the case.

According to this structure, the assembling of components in the case can be easily performed.

In addition, the case may be disposed below a pivot shaft that swingably attach a front end of a rear arm, which supports a rear wheel at a rear end of the vehicle, to the vehicle body.

According to this structure, the brake control system can be disposed under the vehicle body.

Further, a driveshaft driving the rear wheel may be disposed in a rear arm disposed at one side in a width direction of the vehicle body, and the case may be disposed at an opposite side in the width direction of the vehicle body to be deviated, such that the driveshaft and the case does not overlap each other when viewed from a top plane.

According to this structure, the brake control system can be disposed not to interfere with the driveshaft in an upward and downward direction.

In addition, a breather tube may have one end connected to the case and an opposite end that extends above the vehicle body to be exposed to the atmosphere.

According to this structure, it becomes possible that water cannot be easily introduced from an opening of the breather tube into the case.

Effect of the Invention

According to the present invention, since the brake control system is structured such that it is received in the case having the waterproof property, the pipe supporting member, which enables the plurality of the brake pipes to be arranged from an external side of the case into the case, is formed on the case, and the pipe supporting member and the case are detachably attached to each other through a seal member, the waterproof structure can be realized between the pipe supporting member and the case, and there is no need to assemble the plurality of electric wires and hydraulic pipes and the waterproof case with the waterproof structure. Therefore, the wiring and piping work can be easily performed and thus the assemblability is improved.

In addition, since the pipe supporting member detachably connects the brake pipe disposed inside the case and the brake pipe disposed outside the case, the connection work is completed by simply connecting the brake pipe disposed outside the case to the pipe supporting member. Accordingly, the waterproof structure can be easily attained and the assembling work can be easily performed.

Further, since the case includes a plurality of parts and the pipe supporting member is disposed to be fitted to the matching plane of the case, the assembling of the components in the case can be easily performed and thus the assemblability is improved.

In addition, since the case is disposed below the pivot shaft that swingably attach the front end of the rear arm, which supports the rear wheel at the rear end of the vehicle, to the vehicle body, the brake control system is disposed under the vehicle body and thus the low centralization of the vehicle can be realized.

Further, the driveshaft driving the rear wheel is disposed in the rear arm disposed at one side in the width direction of the vehicle body, and the case is disposed at the opposite side in the width direction to be deviated, such that the driveshaft and the case does not overlap each other when viewed from a top plane, the brake control system is disposed not to interfere with the driveshaft in the upward and downward direction and thus the brake control system can be disposed under the vehicle body.

Furthermore, since the breather tube has one end connected to the case and an opposite end that extends above the vehicle body to be exposed to the atmosphere, it becomes possible that water cannot be easily introduced from an opening of the breather tube into the case and thus the intrusion of moisture into the case can be prevented.

DESCRIPTION OF REFERENCE NUMERALS

Figure 1:
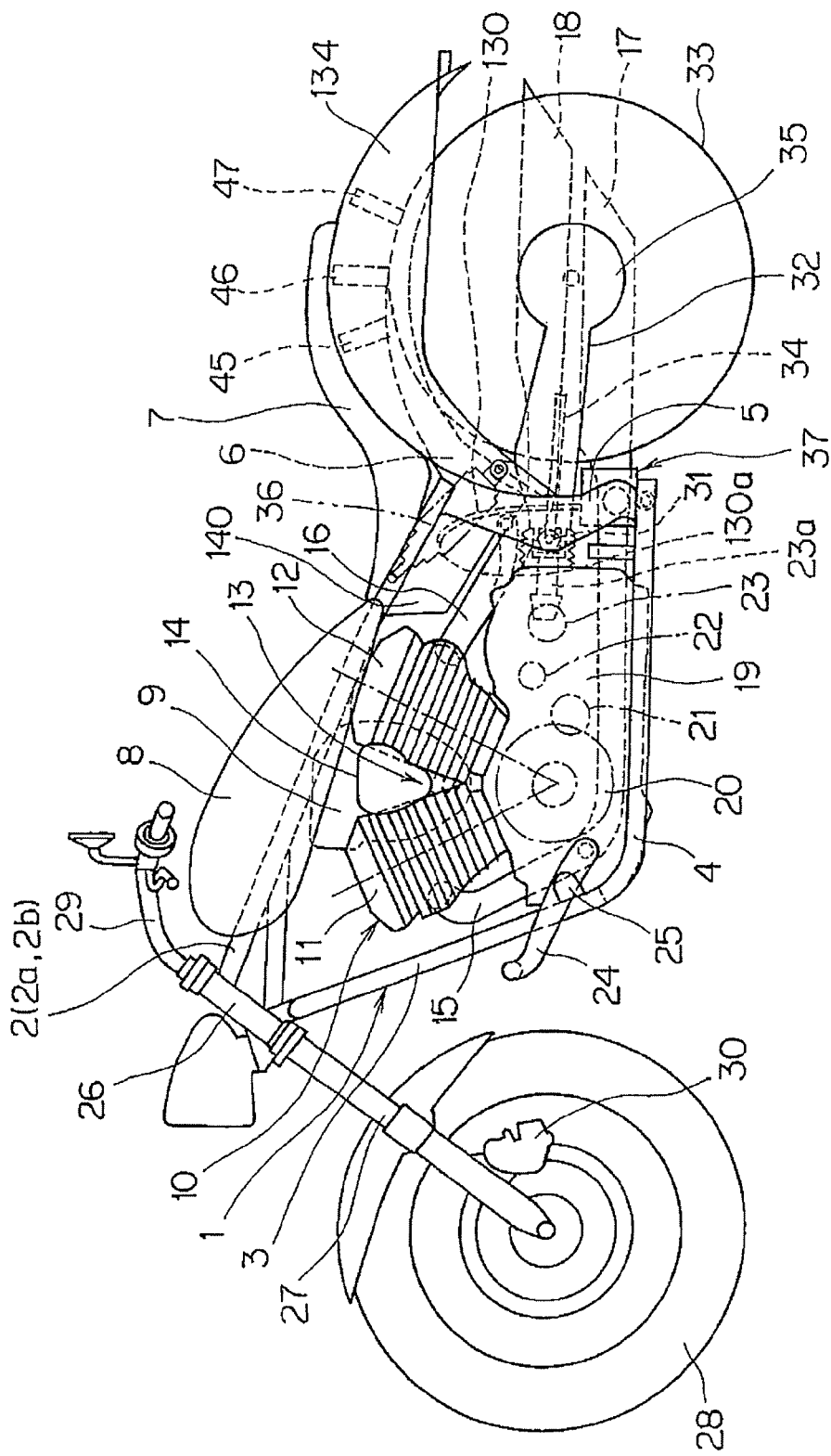
FIG. 1 is a left side view of a motorcycle having a brake control system for a vehicle.

1 Vehicle body frame
2 Main pipe
5 Center frame
10 V-type engine
19 Crankcase
28 Front wheel
30 Front wheel brake
31 Pivot shaft
32 Rear arm
33 Rear wheel
34 Driveshaft
36 Rear cushion unit
37 Brake control system
38 Lower cross pipe
39 Pressure control valve
40 Front master cylinder
50 Space
51 Upper cross pipe
100 Waterproof case (Case)
100a Upper case
100b Lower case
101 Pipe supporting member
101a-101f Through hole
102 Seal member
103 Attaching member
104 Drain port
105 Intake hole
107 Base member
108, 109 Bolt
111 ABS modulator
112 Control unit
113a-113e Brake pipe
114 Attaching latch
115, 117 Connecting terminal
116a-116e Outer brake pipe
118 Relay terminal
119 Bolt
120 Groove portion
121 Protruding portion
130 Breather tube
130a Opening
134 Rear fender
140 Side cover
C Vehicle body center
X Dividing plane

BEST MODE FOR CARRYING OUT THE INVENTION

A preferred embodiment of the present invention will be described below with reference to drawings. In addition, in the drawings, the left, right, upward, downward, front, and rear indicate directions viewed from a rider of the vehicle.

FIG. 1 is a left side view of a motorcycle having a brake control system for a vehicle according to an embodiment of the present invention.

A vehicle body frame 1 of a motorcycle includes a main pipe 2 that extends from a head pipe 26 positioned at a front side of a vehicle body toward a rear side of the vehicle body, a down pipe 3 that extends obliquely downward from the head pipe 26 toward the rear side of the vehicle body, lower pipes 4 that extend rearward from a lower side of the down pipe 3, and center frames 5 that connect rear ends of the main pipe 2 to rear ends of the lower pipes 4. These pipes define a quadrilateral frame shape when viewed from one side.

The center frames 5 have function of seat stays 6 that further extend rearward from a connecting portion with the main pipe 2 and support a seat 7 thereon. A fuel tank 8 is supported on the main pipe 2 in front of the seat 7. An air cleaner 9 and a V-type engine 10 are disposed below the fuel tank 8.

The V-type engine 10 is supported on the vehicle body frame 1. The air cleaner 9 is installed in a V-bank 13 that is a V-shape space defined by front and rear cylinders 11 and 12 of the V-type engine 10. A carburetor case 14 of the air cleaner 9 is shown at a left side of the vehicle body illustrated in FIG. 1. The front and rear cylinders 11 and 12 inhales mixed air from the fuel tank 8 and the air cleaner 9 through an upper portion thereof and discharges the mixed air through exhaust pipes 15 and 16. The exhaust pipes 15 and 16 come out through a right side of the vehicle body and are connected to the mufflers 17 and 18.

In FIG. 1, the reference numerals 19, 20, 21, 22, and 23 indicate a crankcase, a crankshaft, a main shaft, and a counter shaft, and an output shaft gear, respectively. Reference numeral 24 denotes a change pedal that is pivotally coupled to a front-lower side of the crankcase 19. Reference numeral 25 indicates steps that are attached to the down pipe 3 near the change pedal 24. All of the shafts are schematically mimetically illustrated. That is, all of the shafts are actually designed to be engaged with each other by gears arranged on a gear shaft and thus constitute a gear train to sequentially transmit torque.

Upper portions of front forks 27 are rotatably supported on the head pipe 26 positioned at a front end portion of the vehicle body frame 1. A front wheel 28 supported on lower ends of the front forks 27 is steered by handlebars 29 connected to upper end portions of the front forks 27. Reference numeral 30 indicates a front wheel brake that is a hydraulic disk brake.

A front end portion of a rear arm 32 is swingably supported on the center frames 5 by a pivot shaft 31. The rear arm 32 is formed in a roughly U-shape when viewed from a top plane view and has left and right arms that extend from the pivot shaft 31 toward a rear side of the vehicle body and between which a rear wheel 33 is disposed. The left arm is formed in a hollow shape and a driveshaft 34 penetrates through the hollow left arm in a forward and backward direction. The rear wheel 33 is supported on a rear end of the rear arm 32 and is shaft-driven through the driveshaft 34 installed in the rear arm 32 and a gearbox 35. Torque of the driveshaft 34 is transferred through an output shaft 23a. Although not shown in FIG. 1, a hydraulic rear wheel brake is also installed on the rear wheel 33. A rear cushion unit 36 is installed between middle portions of the rear arm 32 and main pipe 2 in the forward and backward direction.

In addition, the reference numeral 140 indicates side covers covering the rear-side portion of the V-type engine 10.

Figure 2:
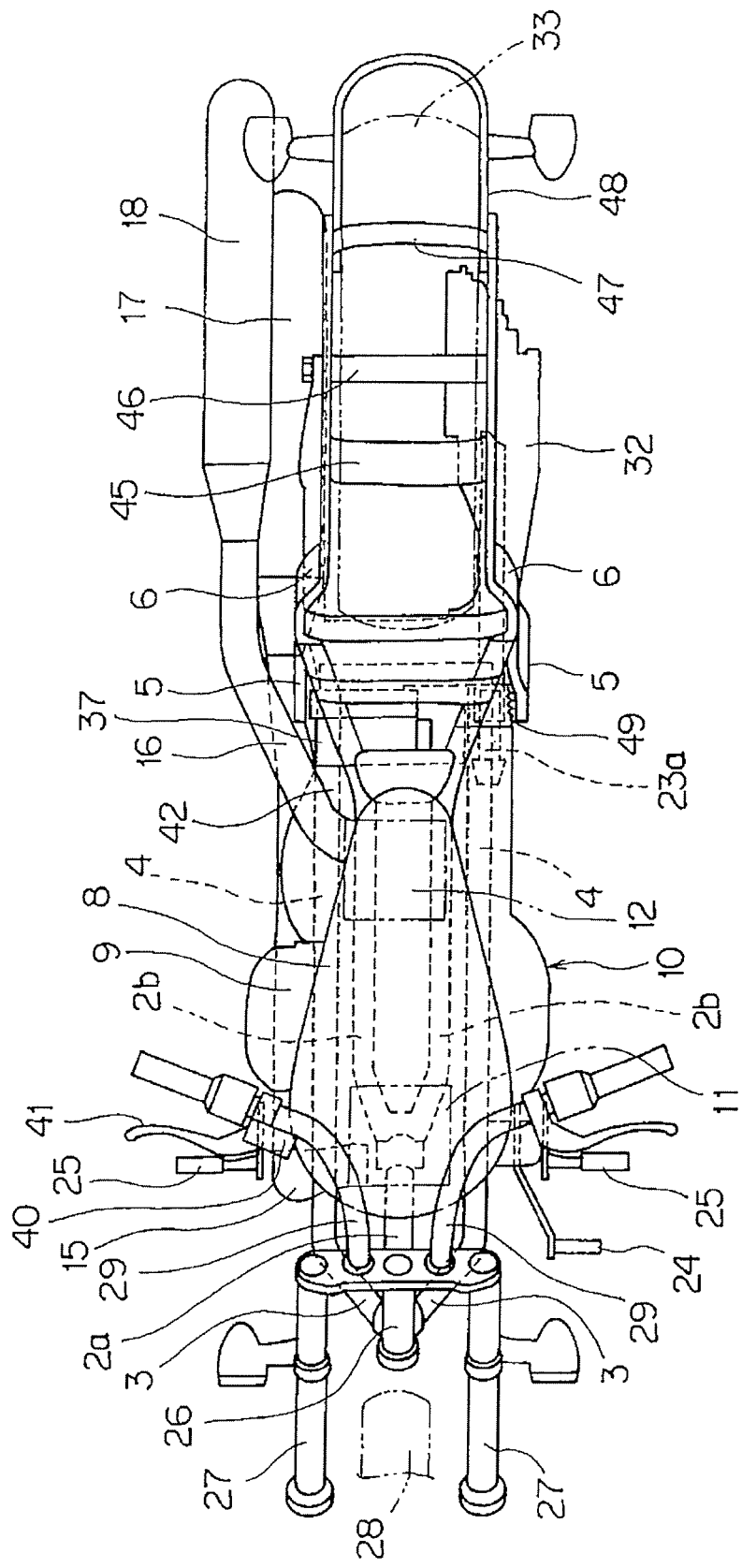
FIG. 2 is a top plane view of FIG. 1.

FIG. 2 is a top plane view of the motorcycle (the seat is omitted).

The front forks 27, steps 25, handlebars 29, lower pipes 4, center frames 5, seat stays 6 are installed in pairs at left and right sides with reference to a vehicle body center line in the forward and backward direction. Further, the main pipe 2 is also paired at a rear-half portion thereof in the forward and backward direction. Meanwhile, the exhaust-line components such as the exhaust pipes 15 and 16, the mufflers 17 and 18, and the air cleaner 9 are disposed to protrude outward from the right side of the vehicle body.

A joint rubber boot 49 is attached to a joint portion of the driveshaft 34 installed on the front end of the rear arm 32 to cover a joint portion between the driveshaft 34 and the output shaft 23a.

In FIG. 2, the reference numeral 40 indicates a front master cylinder that is installed near a right brake lever 41 of the right handlebar 29 and generates hydraulic pressure in accordance with the manipulation of the right brake lever 41.

In addition, the reference numerals 45, 46, and 47 indicate cross plates installed between the left and right seat stays 6. Rear ends of the left and right seat stays 6 are interconnected by a member 48 that is foamed in an approximately U-shape when viewed from a top plane. As shown in FIG. 1, a rear fender 134 that covers an upper portion of the rear wheel 33 is installed above the cross plates 45, 46, and 47. A front end of the rear fender 134 extends to a location near the rear arm 32 and covers even a front portion of the rear wheel 33. The front end portion of the rear fender 134 prevents water, which is thrown up by the rear wheel 33 during driving, from entering a breather tube 130, which will be described later, through an opening 130a of the breather tube 130.

Figure 3:
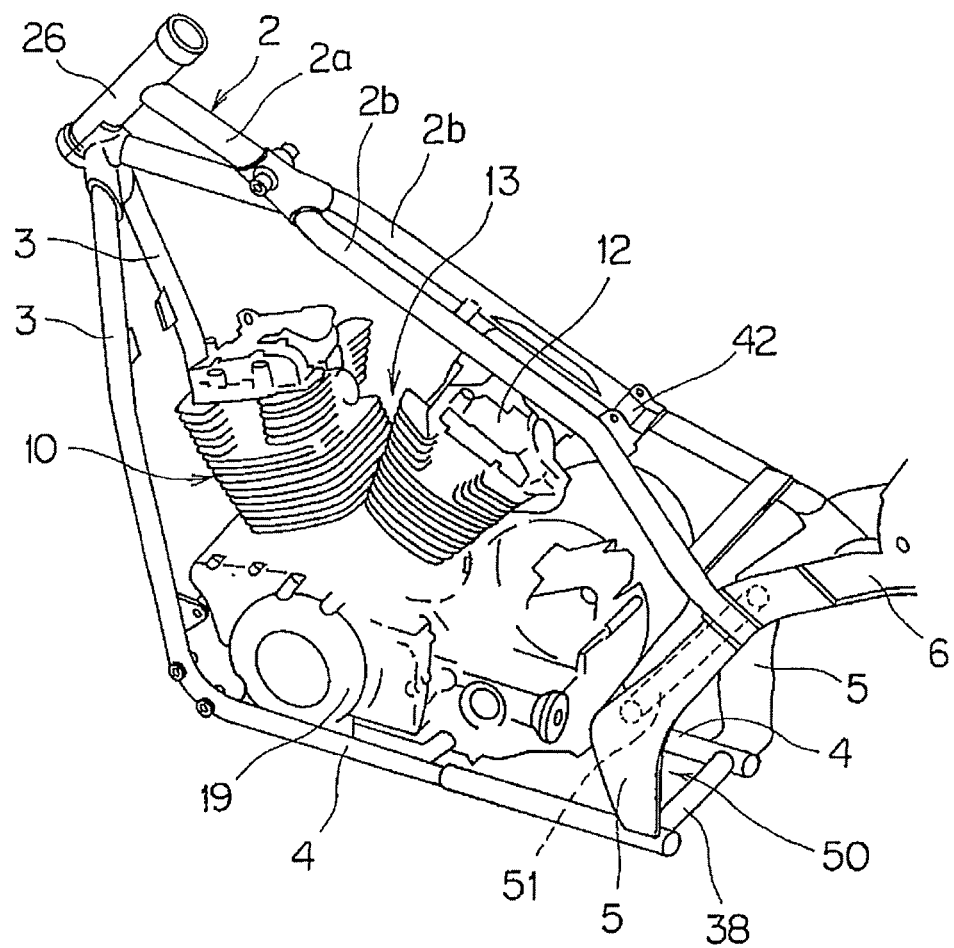
FIG. 3 is a perspective view of a vehicle body frame and a V-type engine.
Figure 4:
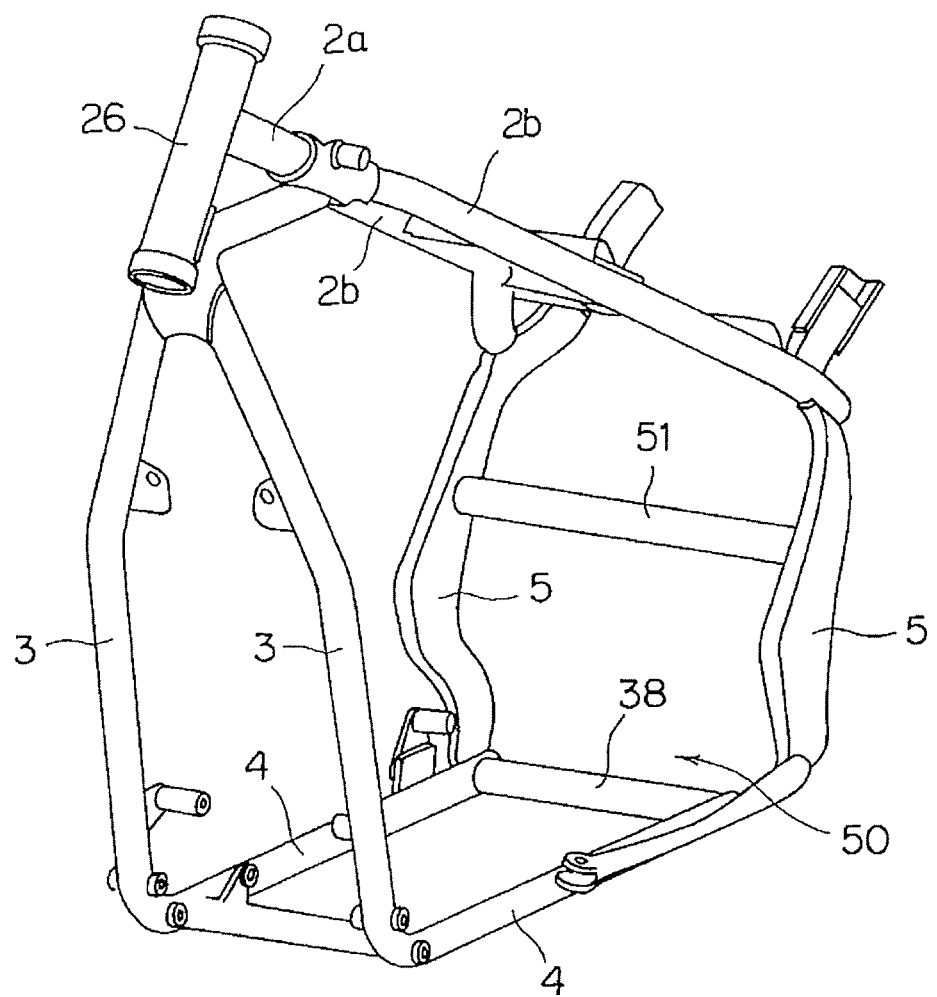
FIG. 4 is a perspective view of the vehicle body frame obliquely viewed from a front side.

FIG. 3 is a perspective view of the vehicle body frame 1 and the V-type engine 10 when obliquely viewed from above a left-rear side of the vehicle body. In FIG. 3, the air cleaner 9 is omitted. Further, FIG. 4 is a view of FIG. 3 from which the engine 10 is omitted, illustrating the vehicle body frame 1 obliquely viewed from above a left-front side of the vehicle body.

As shown in FIG. 3, the main pipe 2 includes one front part 2a that is positioned along the vehicle body center and a rear part 2b that is divided into left and right parts that are in approximately parallel with each other. Middle portions of the left and right parts of the rear part 2b in the forward and rearward direction are interconnected by the cross plate 42.

A front end of the rear cushion unit 36 (see FIG. 1) is supported on the cross plate 42. The left and right parts of the rear part 2b further extend rearward from the cross plate 42 while being widened in the left and right direction and are welded to an outer side of respective shoulder portions of the left and right center frames 5.

The center frames 5 are plate-shaped members that are properly made through a proper method such as casting using a proper material having rigidity such as a variety of different kinds of metal including a light alloy. The center frames 5 are integrally formed with the seat stays 6. With reference to a boundary defined by a portion to which the rear ends of the main pipe 2 are connected, an upper portion forms the seat stays 6 that are curved and extend rearward.

As shown in FIG. 4, middle portions of the left and right center frames 5 are connected to each other by an upper cross pipe 51 and lower end portions of the left and right center frames 5 are welded to respective rear end portions of the left and right lower pipes 4. The rear end portions of the left and right lower pipes 4 are interconnected by a lower cross pipe 38.

Figure 5:
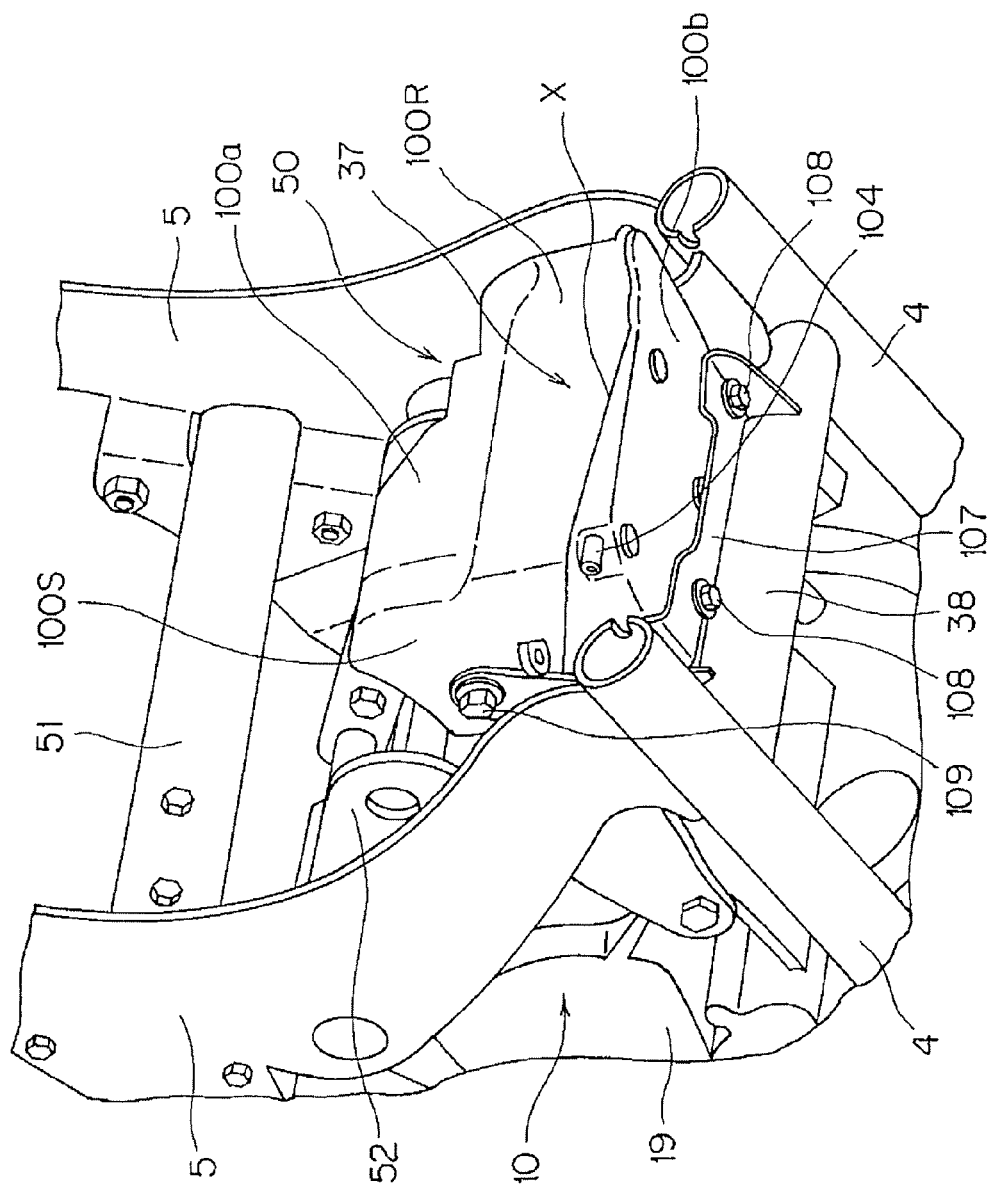
FIG. 5 is a perspective view of an attaching portion of the brake control system obliquely viewed from below a rear side.
Figure 6:
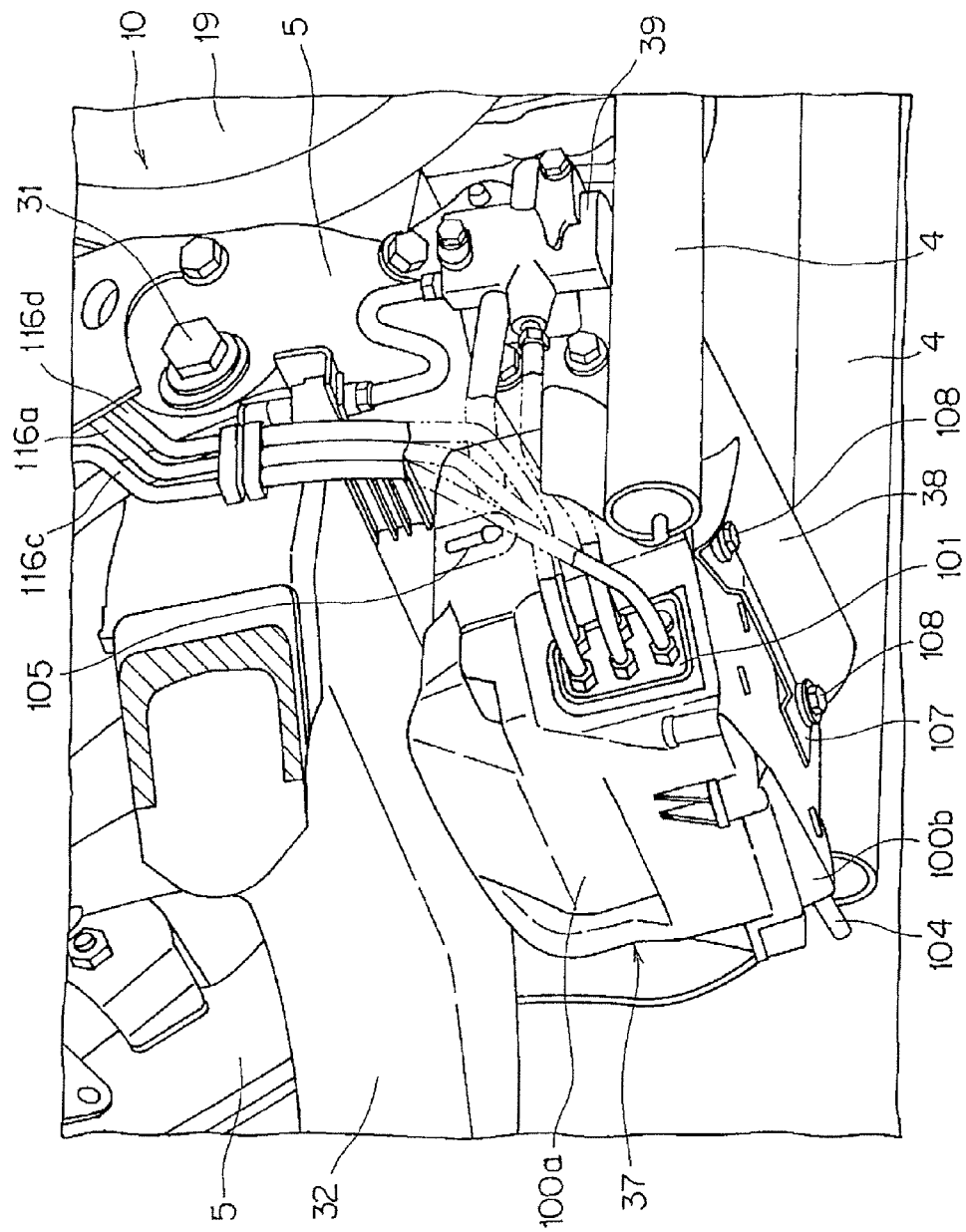
FIG. 6 is a perspective view of FIG. 5 obliquely viewed from below a right-rear side of the vehicle body.

FIG. 5 is a perspective view illustrating a state where the brake control system 37 is attached in a space 50, when obliquely viewed from below a left-rear side of the vehicle body. FIG. 6 is a similar view to FIG. 5, which is obliquely viewed from above a right-rear side of the vehicle body. In order to clearly show positional relations, the rear arm 32 is illustrated.

As shown in FIG. 5, a pivot shaft supporting member 52 is attached to a rear end of the V-type engine 10. The pivot shaft 31 (see FIG. 1) is disposed in parallel with the upper cross pipe 51 and suspended on the pivot shaft supporting member 52. The rear arm 32 shown in FIG. 6 is swingably attached to the pivot shaft 31.

By the vehicle body side member, the space 50 (see FIGS. 3, 4, and 5) surrounded by the left and right center frames 5, upper cross pipe 51, and lower cross pipe 38 is formed. By utilizing the space 50, the brake control system 37 that is received in a waterproof case 100 and attached thereto, which will be described later, is disposed.

Figure 12:
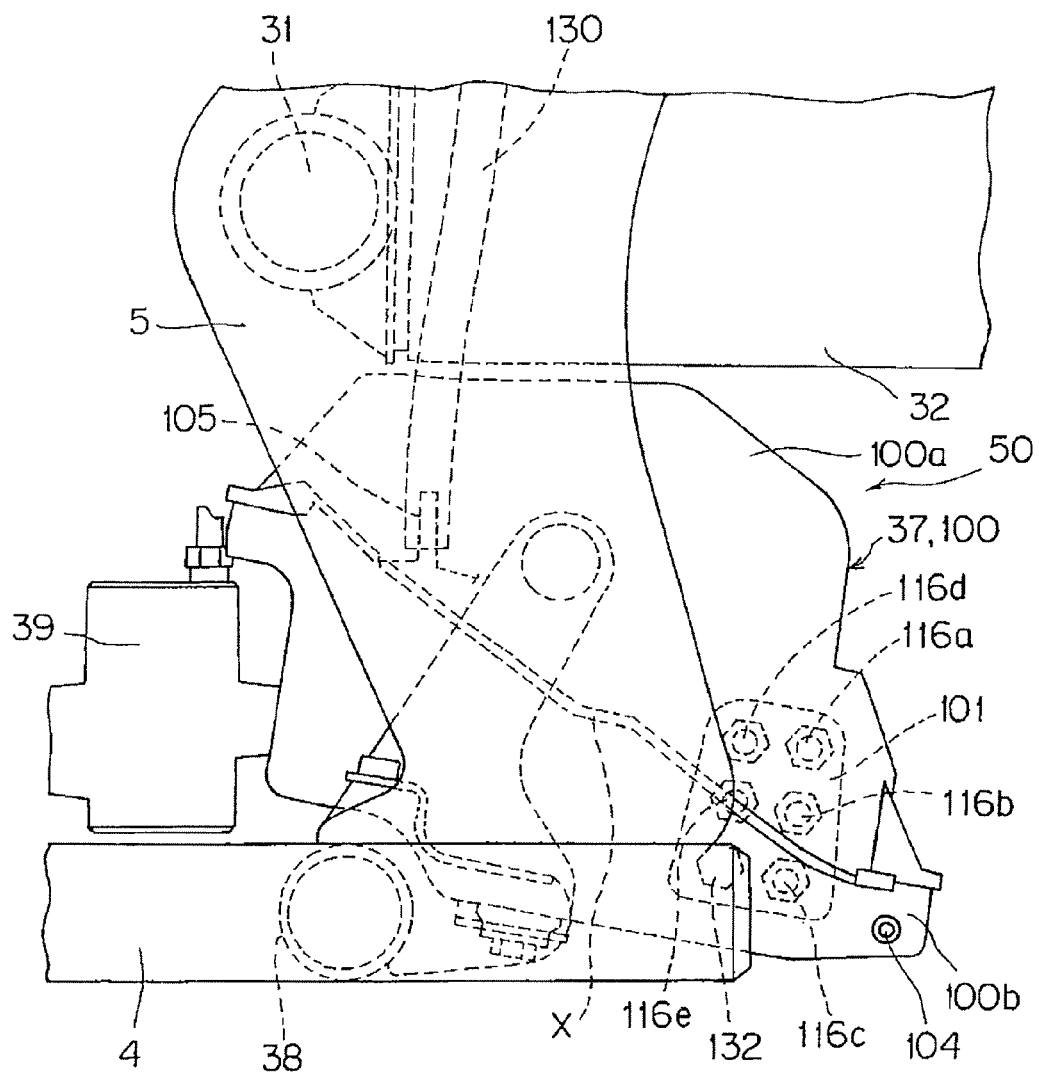
FIG. 12 is a left side view illustrating a state where a waterproof case is attached to a vehicle body side.

In more detail, the brake control system 37 is disposed in the space 50 to be lower than the pivot shaft 31 (see FIG. 12). In addition, the brake control system 37 is disposed at a portion deviated rightward (toward the other side) in a width direction of the vehicle body from the driveshaft 34 (see FIG. 1) disposed inside the left arm of the rear arm 32 (see FIGS. 1 and 6). That is, the brake control system 37 (the waterproof case 100) is disposed not to overlap the driveshaft 34 when viewed from a top plane.

The brake control system 37 of this embodiment is a front/rear wheel ABS type. This brake control system 37 automatically controls the operation of the front wheel brake 30 and rear wheel brake (not shown) by controlling hydraulic pressure of the front wheel brake 30 and rear wheel brake in a state where the front and rear wheels 28 and 33 are likely to be locked in accordance with detected information such as a vehicle speed and the like and prevents the front and rear wheels 28 and 33 from being locked.

Since the brake control system 37 is attached in the space 50 defined at lower portion of the vehicle body, the brake control system 37 may possibly wet by the water and the like that is splashed by the front wheel 28 during driving. Therefore, an outer side of the brake control system 37 is covered with the waterproof case 100 having a waterproof property. The waterproof case 100 is divided into upper and lower sections. That is, the waterproof case 100 includes an upper case 100a, a lower case 100b, and a pipe supporting member 101 that is disposed to be fitted into the upper case 100a and lower case 100b. Each of the upper case 100a and lower case 100b is formed through a resin molding process.

A dividing plane X between the upper and lower cases 100a and 100b is defined within a bottom of the waterproof case 100 at a rear surface 100R of the waterproof case 100 and extend obliquely upward toward the front side of the vehicle body at side surfaces 100S of the waterproof case 100. Therefore, the workability for arranging brake pipes 113 in the lower case 100b can be improved and the connection work for connecting the brake pipes 113 to the pipe supporting member 101 can be easily performed (see FIG. 8). This will be described in detail later.

In addition, as shown in FIG. 5, a drain port 104 extending outward from the vehicle body is formed on a rear end portion of a side surface of the lower case 100b, which defines a rear-lower side of the water proof case 100. The drain port 104 is formed in a pipe shape protruding outward from the vehicle body. A drain tube (not shown) or the like is attached to the drain port 104.

Further, as shown in FIG. 6, an intake hole 105 extending in the forward and backward direction of the vehicle body is formed on a front end portion of the side surface of the upper case 100a, which defines a front-upper side of the waterproof case 100.

In addition, as shown in FIG. 12, one end of the breather tube 130 is attached to the breathing hole 105. The breather tube 130 extends upward from the upper case 100a and an opening 130a formed on the other end of the breather tube 130 is positioned at a lower portion of the seat 7 (see FIG. 1). As shown in FIG. 1, a top of the opening 130a is covered with the seat 7, a front portion of the opening 130a is covered with the cylinder, a rear portion of the opening 130a is covered with the rear fender 134, and side portions of the opening 130a is covered with the side cover 140. Therefore, rainwater and the like cannot be easily entered through opening 130a from each of the directions. Therefore, the external air flows from the breathing hole 105 into the waterproof case 100 through the breather tube 130.

Figure 11:
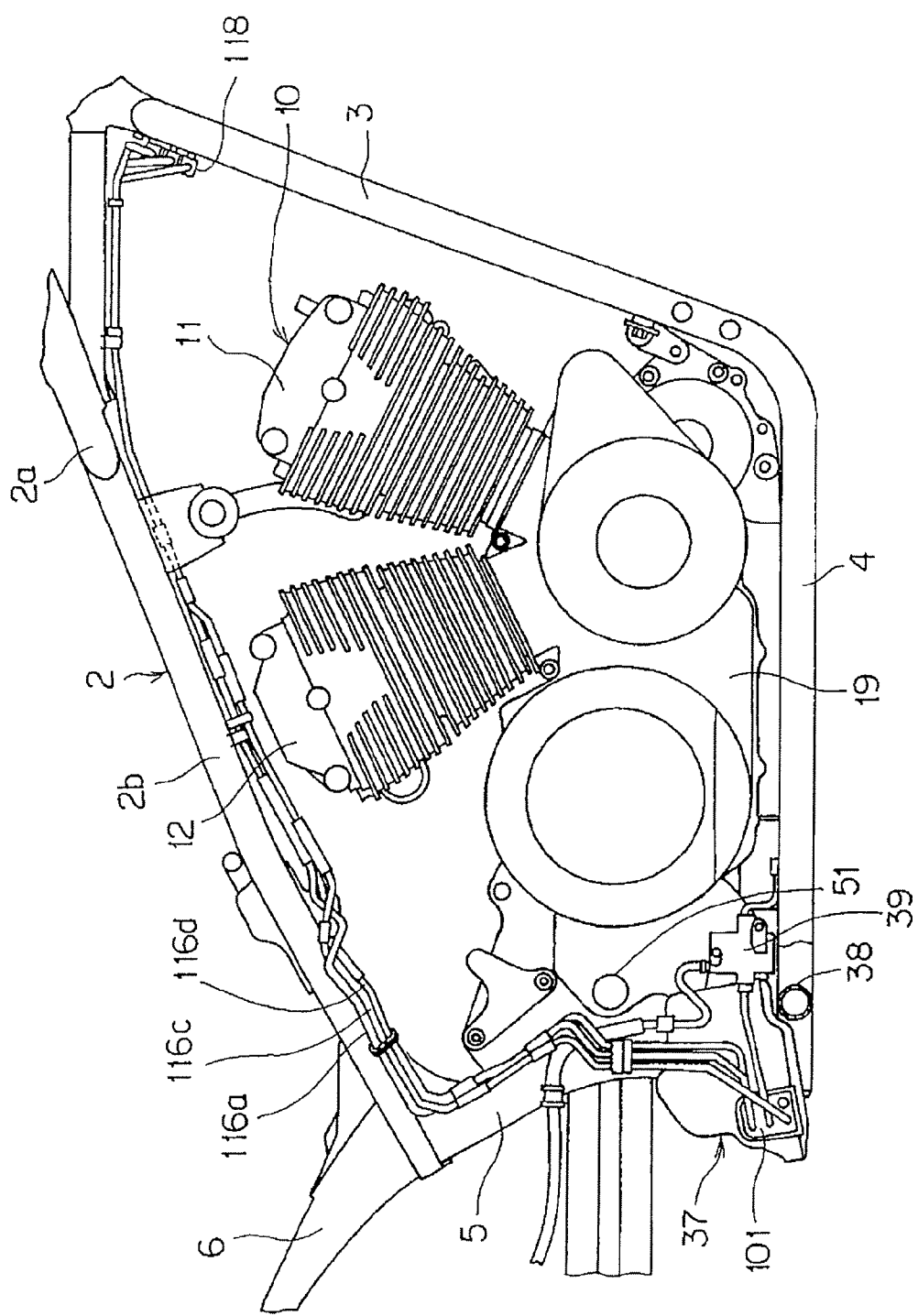
FIG. 11 is a piping diagram of outer brake pipes.

Further, in FIG. 6, reference numeral 39 indicates a control valve that is disposed at a right-rear end of the crankcase 19 (see FIGS. 1, 6, and 11).

The pipe supporting member 101 is formed in an approximately rectangular parallelepiped shape and formed of metal. Further, the pipe supporting member 101 is provided with five through holes 101a, 101b, 101c, 101d, and 101e (see FIG. 8) that are formed to extend from an outside into inside of the waterproof case 100. Screw threads for coupling the hydraulic pipes are processed on openings of the respective through holes 101a through 101e.

As shown in FIG. 5, the brake control system 37 is attached to the lower cross pipe 38 through a base member 107 formed by processing a steel sheet. The base member 107 is formed in an approximately L-shape. A lower portion of the base member 107 is fixed to the lower cross pipe 38 by welding process. The brake control system 37 is attached to the base member 107 by a bolt 108 (which is coupled to the lower case 100b that will be described later) inserted through an undersurface of the base member 107 and a bolt 109 (which is coupled to the upper case 100a that will be described later) inserted from a side of the vehicle body.

In a state where the brake control system 37 is attached to the base member 107, as shown in FIGS. 5, 6, and 11, a bottom surface of the brake control system 37 is slightly inclined downwardly at rear side thereof. Therefore, a location of the drain port 104 becomes a lowermost end of the waterproof case 100 and thus the water entering the waterproof case 100 can be discharged out of the waterproof case 100 through the drain port 104.

As described above, by disposing the brake control system 37 in the space 50, it becomes possible to prevent a lower portion of the brake control system 37 from protruding toward the lower portion of the lower pipe 4 and, at the same time, to conceal the brake control system 37 with the lower pipe 4 and the center frame 5 so that it becomes difficult to see the brake control system 37 from the external side of the vehicle body (i.e., the brake control system 37 can be disposed unseen).

Figure 7:
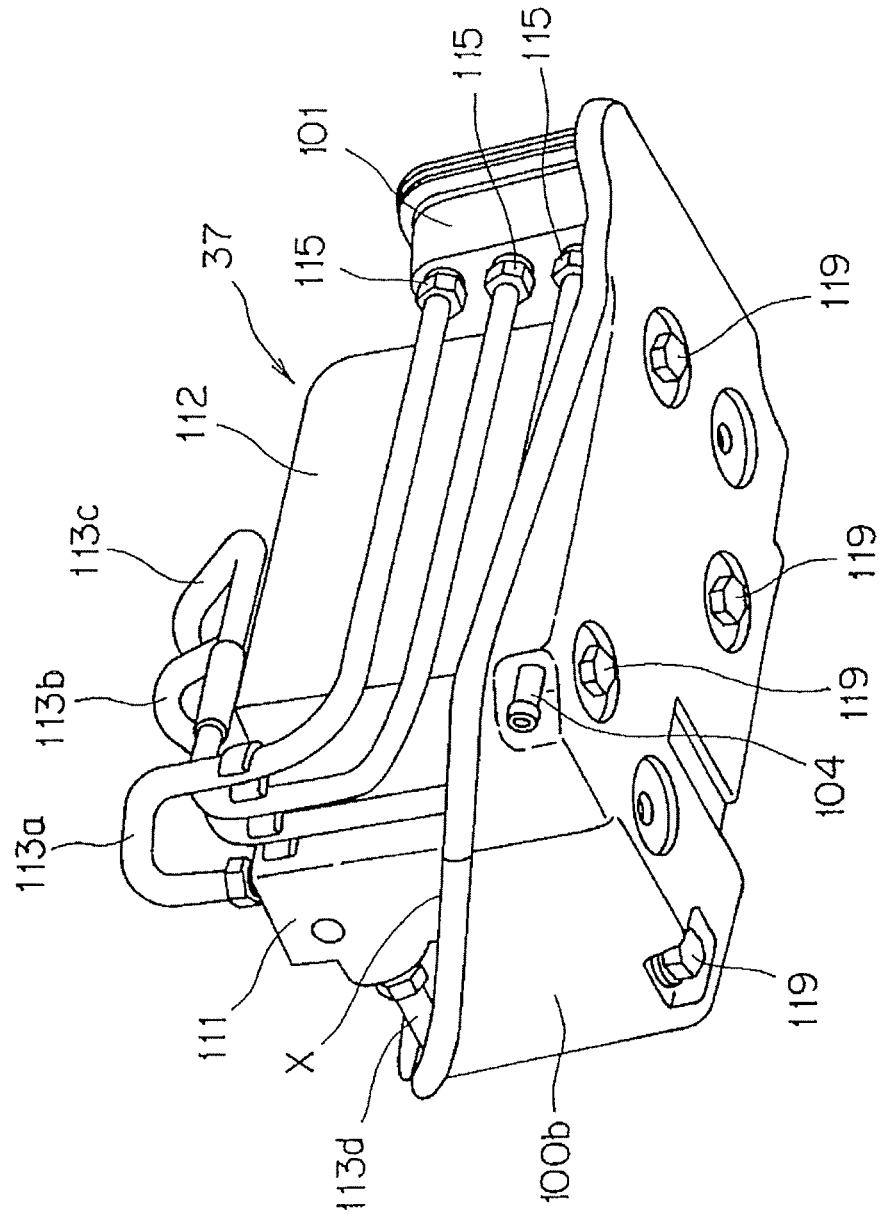
FIG. 7 is a perspective view illustrating a state where an upper case is removed from the brake control system.
Figure 8:
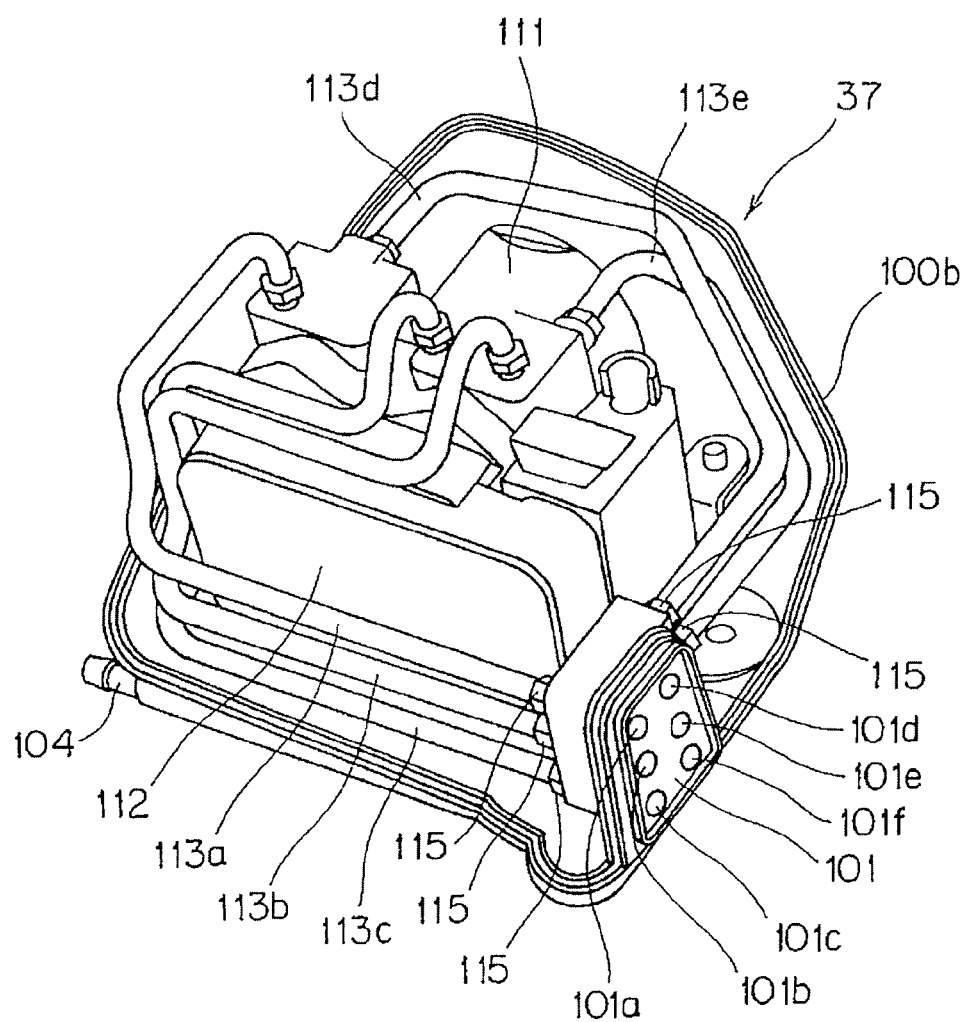
FIG. 8 is a perspective view that is attained by seeing FIG. 7 from above at a different angle.

FIG. 7 is a perspective view illustrating a state where the upper case 100a is omitted from the brake control system 37. In addition, FIG. 8 is a perspective view that is attained by viewing FIG. 7 at a different angle. Further, FIG. 9 is a perspective view illustrating a state where the lower case 100b is removed from FIG. 7.

The upper and lower cases 100a and 100b are detachably attached to each other by fasteners (not shown) such as screws. The dividing plane X of the waterproof case 100 is waterproofed with the use of a seal structure when the upper and lower cases 100a and 100b are assembled.

Figure 9:
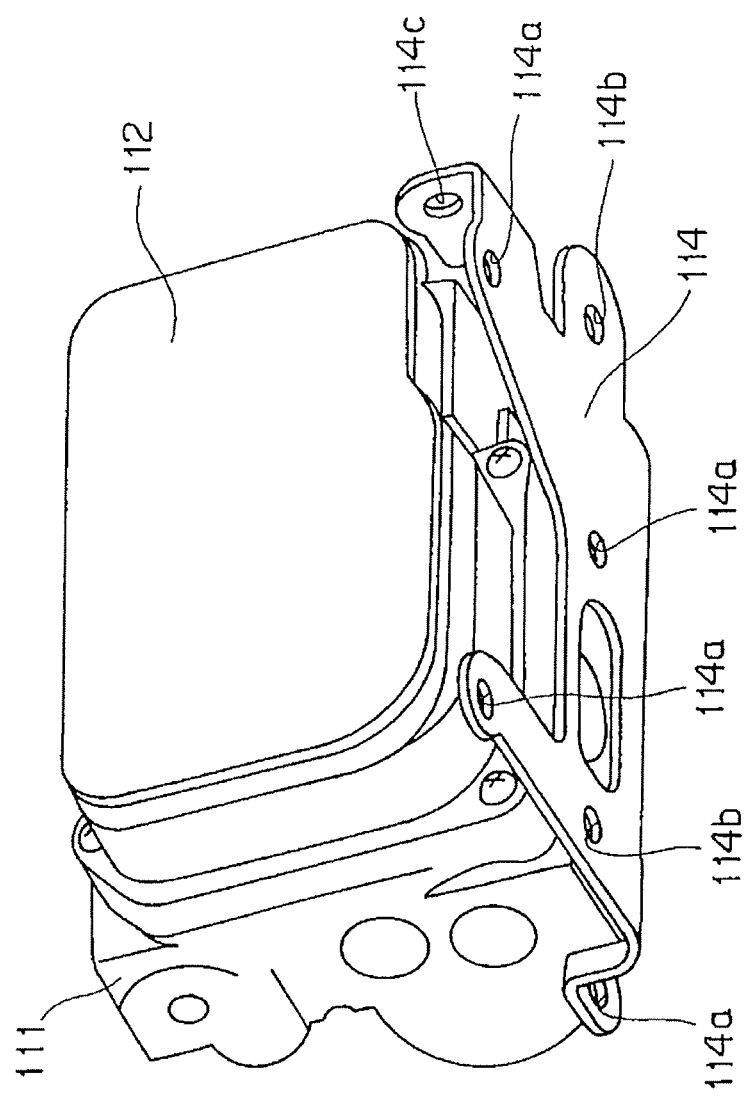
FIG. 9 is a perspective view illustrating a state where a lower case is removed from FIG. 7.

As shown in FIGS. 7 through 9, an ABS modulator 111 and control unit 112 are received in the waterproof case 100 as constitutional elements of the brake control system 37. The ABS modulator 111 and control unit 112 are disposed on an attaching latch 114 and attached to the lower portion of the lower case 110b by bolts 119. In FIG. 9, four attaching hole 114a are for insertion and passing of the bolts 119, two attaching holes 114b are for insertion and passing of the bolts 108 for attaching to the base member 107 shown in FIG. 5, and an attaching hole 114c is for common coupling with the pipe supporting member 110.

Five brake pipes 113a, 113b, 113c, 113d, and 113e are connected to the ABS modulator 111. In more detail, the brake pipes 113d and 113e are respectively connected to the front master cylinder 40 (see FIG. 2) and the rear master cylinder (not shown) and the brake pipes 113a, 113b, and 113c are connected to front brake calipers and one rear brake caliper.

Meanwhile, electric wires (not shown) for inputting signals from vehicle wheel speed sensors (not shown) detecting rotating states of the front and rear wheels 28 and 33 and for outputting signals such as ABS alarm signals and the like are connected to the control unit 112.

The control unit 112 controls the ABS modulator 111 according to the signals from the vehicle speed sensor. That is, the ABS modulator 111 pressure-feeds brake oil from a pump (motor pump) in the ABS modulator 111 to each of the brake pipes 113a, 113b, and 113c in accordance with the signals from the control unit 112.

Each of the brake pipes 113a through 113e is a metal pipe that has a less outer diameter than a rubber pipe and is not expandable. As shown in FIG. 8, these five brake pipes 113a through 113e are arranged into the waterproof case 100 and respectively connected to connecting openings (connecting openings that are close to the inside of the waterproof case 100) of the five through holes 101a through 101e (101f is not used) of the pipe supporting member 101. This connection is realized by screw terminals 115 installed on respective extreme ends of the brake pipes 113a through 113e and the respective connecting openings together. The connecting terminals 115 serve to prevent the rainwater and the like from being intruded from the connecting openings into the through holes 101a through 101e in a state where the brake pipes 113a through 113e are connected to the connecting openings.

In addition, the unused through hole 101f is to screw the pipe supporting member 101 and the attaching hole 114c of the attaching latch 114 together using the bolt 132 (see FIG. 12).

Figure 10:
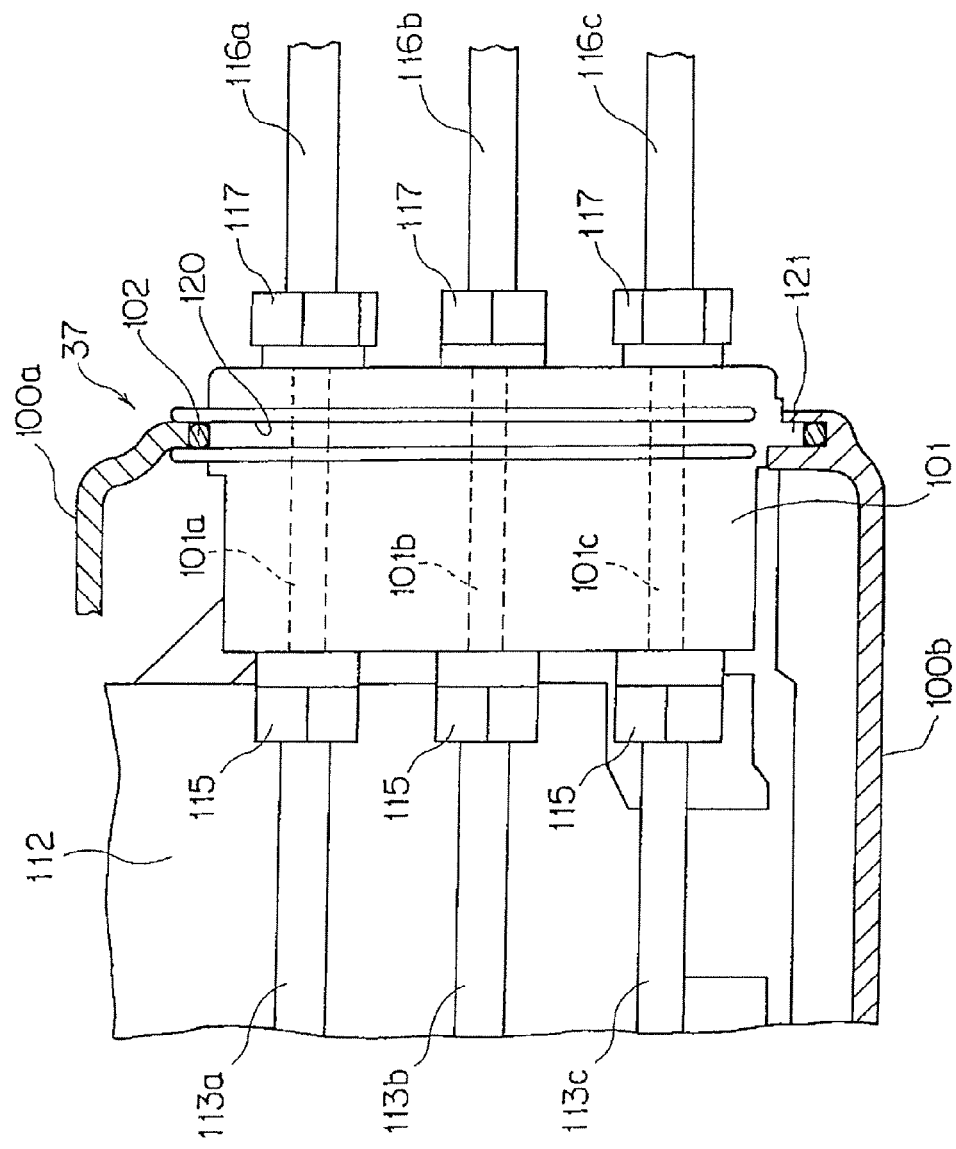
FIG. 10 is a cross-sectional view illustrating a seal structure of a pipe supporting member, upper case, and lower case.

FIG. 10 is a cross-sectional view illustrating a seal structure between the pipe supporting member 101 and the upper case 100a and between the pipe supporting member 101 and the lower case 100b. In addition, FIG. 11 is a piping diagram of outer brake pipes 116a, 116b, and 116c.

As shown in FIG. 10, the pipe supporting member 101 has one outer end surface that is formed in a prismatic shape and exposed to an external side of the waterproof case 100 and an opposite inner end surface and four side surfaces that contact an inner surface of the waterproof case 100. The through holes 101a, 101b, and 101c described above are famed to extend from the outer end surface to the opposite inner end surface and the through holes 101d, 101e, and 101f are formed to extend from the outer end surface to one side surface (opposite to the side surface shown in FIG. 10, see FIG. 8).

As shown in FIG. 10, a groove portion 120 is formed extending on top and both side surfaces of the pipe supporting member 101. A ring-shaped seal member 102 is fitted in the groove portion 120 and the upper case 100a is further fitted in the groove portion 120.

In addition, as shown in FIG. 10, a protruding portion 121 extending in a width direction is provided at an undersurface of the pipe supporting member 101. The protruding portion 121 is fitted in a groove portion formed on the lower case 100b after the seal member 102 is fitted in the groove portion described above.

That is, since the pipe supporting member 101 is attached to the upper and lower cases 100a and 100b by the fit, the pipe supporting member 101 is disposed in the form of fitting to the dividing plane X between the upper and lower cases 100a and 100b and is configured to be detached and attached freely. Further, since the seal member 102 is fitted to the fitting portion, the fitting portion is to have the waterproof structure.

In addition, the seal member 102 is an elastic rubber packing such as an O-ring and the like. Further, the sealing member 102 may be a caulking member having a seal property.

As shown in FIG. 10, the outer brake pipes 116a, 116b, 116c, 116d, and 116e are connected to the pipe supporting member 101 through respective connecting terminals 117. Each of the outer brake pipes 116a through 116e is a metal pipe that has a less outer diameter than a rubber pipe and is not expandable. The connection of the outer brake pipes 116a through 116e is realized by screwing the connecting terminals 117 installed on respective extreme ends of the outer brake pipes 116a through 116e and connecting openings together. Like the connecting terminals 115, the connecting terminals 117 serve to prevent the rainwater and the like from being intruded from the connecting openings into the through holes 101a through 101e in a state where the brake pipes 113a through 113e are connected to the connecting openings.

In addition, reference characters "a" through "e" represent that the outer brake pipes 116a through 116e correspond to the brake pipes 113a through 113e, respectively, and to the through holes 101a through 101e, respectively.

The outer brake pipes 116a, 116c, 116d among the outer brake pipes 116a through 116e, as shown in FIG. 11, are arranged along the right center frame 5 and the right main pipe 2 and connected to a relay terminal 118 disposed near the head pipe 26. From the relay terminal 118, the outer brake pipes 116a and 116c are connected to the brake calipers near the front wheel and the outer brake pipe 116d is connected to the front master cylinder 40.

Meanwhile, the outer brake pipe 116b is connected to the brake caliper near the rear wheel and the outer brake pipe 116e is connected to the rear master cylinder (not shown).

According to the brake control system for the vehicle of the embodiment of the present invention, since the brake control system 37 is received in the waterproof case 100 having the waterproof property, the brake control system 37 can be sufficiently protected even when the brake control system 37 is disposed at a location to which the rainwater and the like (including muddy water and the like in addition to the rainwater) easily spatters. Specifically, when the brake control system is disposed at the lower portion of the vehicle body to lower a vehicle body center as low as possible, the muddy water frequently spatters from the vehicle wheels onto the brake control system. However, since the brake control system is protected by the waterproof case 100, the spattering of the muddy water onto the brake control system 37 or the ABS modulator 111 can be prevented. Therefore, the reliability of the brake control system 37 can be improved.

In addition, the plurality of the brake pipes 113a through 113e and 116a through 116e for connecting the ABS modulator 111 received in the waterproof case 100 to the front and rear wheel brakes disposed out of the waterproof case 100, the pipe supporting member 101 to which the plurality of the brake pipes 113 and 116 are connected is attached to the waterproof case 100, and the pipe supporting member 101 and the waterproof case 100 are detachably attached to each other through the seal member 102. Therefore, a portion between the pipe supporting member 101 and the waterproof case 100 can be formed in the waterproof structure. Accordingly, by realizing the connection of the plurality of the brake pipes 113 and 116 using the connecting terminals 115 and 117 each having the waterproof property, the brake pipes 113 and 116 can be easily connected while maintaining the waterproof property of the waterproof case 100. Therefore, the piping work can be easily performed.

In addition, since the pipe supporting member 101 is structured such that it is detachably attached to the upper and lower cases 100a and 100b by fit, the waterproof case 100 can be easily assembled. Further, the seal member 102 can be easily mounted.

Further, the waterproof case 100 is divided into two sections, i.e., the upper and lower cases 100a and 100b, and the pipe supporting member 101 is disposed such that it is fitted to the dividing plane X between the upper and lower cases 100a and 100b. Further, the brake control system 37 or the ABS modulator 111 can be easily assembled in the waterproof case 100. Specifically, the piping work for arranging the brake pipes 113a through 113e into the brake control system 37 can be easily performed.

In addition, by forming the seal member on the matching plane between the upper and lower cases 100a and 100b, the waterproof structure can be easily realized.

Further, since the waterproof case 100 is disposed below the pivot shaft 31 that swingably attach the front end of the rear arm 32, which supports the rear wheel 33 at the rear end of the vehicle, to the vehicle body, the brake control system 37 that is relatively heavy is disposed at the lower portion of the vehicle body and thus the low centralization of the vehicle can be realized.

Further, the driveshaft 34 driving the rear wheel 33 is disposed inside the rear arm 32 disposed at one side in the width direction of the vehicle body and the waterproof case 100 is deviated to and disposed at the other side in the width direction of the vehicle. Therefore, the drive shaft 34 and the waterproof case 100 do not overlap one another when viewed from the top plane and thus the brake control system 37 and the driveshaft 34 do not overlap one another in the upward and downward direction. Accordingly, the brake control system 37 can be disposed at a location where lower portion of the vehicle body. Particularly, since the driveshaft 34 moves in the upward and downward direction together with the rear arm 32, the space 50 can be utilized without being wasted by disposing the driveshaft 34 and the rear arm 32 at locations that are free from intervention in the upward and downward direction.

In addition, since the other end of the breather tube 130 having one end connected to the waterproof case 100 extends above the vehicle body to be exposed to the atmosphere, the air can be discharged out of the waterproof case 100 and the water cannot be easily introduced from the opening 130a of the breather tube 130 into the waterproof case 100. Therefore, the introduction of moisture into the waterproof case 100 can be prevented.

Further, by disposing the brake control system 37 in the space 50, the brake control system 37 is to be surrounded by the center frame 5, upper cross pipe 51, and lower cross pipe 38 and thus it becomes difficult to see the brake control system 37 from the external side of the vehicle body (i.e., the brake control system 37 can be disposed unseen). Therefore, the exterior of the vehicle body of the vehicle having a side portion that is not covered with a vehicle body cover can be improved.

The above-mentioned embodiment is one aspect of the present invention, and may be appropriately modified without departing from the scope and spirit of the present invention.

For example, although the waterproof case 100 is divided into two sections, i.e., the upper and lower cases 100a and 100b in this embodiment, the waterproof case 100 may be monolithic if the waterproof case 100 is formed to have the waterproof structure. For example, the main body of the waterproof case is formed to be monolithic and an opening for attaching the pipe supporting member 101 is formed on the waterproof case. The pipe supporting member 101 is attached to the opening through, for example, a fitting manner. Even with this structure, the waterproof structure can be entirely attained. Further, even in this case, the ABS modulator 111 and the like are mounted in the case through the opening.

On the contrary, if the waterproof structure could be attained, the same effect can be attained by dividing the waterproof case 100 into two or more sections and providing the waterproof structure to each of the matching planes.

In addition, although the brake pipes 113a through 113e and 116a through 116e are separately installed and communicated with each other through the through holes 101a through 101e of the pipe supporting member 101 in this embodiment, the brake pipes may be integrated each other and attached. For example, it is possible such that the brake pipes 113a and 116a are integrated as a single pipe and this single pipe is inserted through the through hole 101a of the pipe supporting member 101. Even in this case, the through hole 101a is sealed by the connecting terminal to provide the waterproof structure.

Meanwhile, although the brake control system 37 is installed in the space 50 above the cross pipe 38 in this embodiment, the installing location is not limited. That is, even when the brake control system 37 is installed at a portion onto which the rainwater may spatter, the waterproof structure of this embodiment can be applied.

The invention claimed is:

1. A brake control system for a vehicle having a vehicle body comprising a vehicle frame, wherein said brake control system is configured to be connected to hydraulic brakes through a plurality of brake pipes to control hydraulic pressure of the hydraulic brakes,
wherein the brake control system comprises:
an electronic control module which is received in a case having a waterproof property, a pipe supporting manifold member, which enables the plurality of the brake pipes to be arranged from an external side of the case into the case, the pipe supporting manifold member attached to the case, wherein the pipe supporting manifold member and the case are detachably attached to each other through a seal member,
wherein the case is disposed inside of the vehicle frame below a pivot shaft that swingably attaches a front end of a rear swing arm, which supports a rear wheel at a rear end of the vehicle, to the vehicle body,
wherein a driveshaft driving the rear wheel is disposed in a part of the rear swing arm disposed at one side in a width direction of the vehicle body, and the case is disposed at an opposite side in the width direction of the vehicle body, such that the driveshaft and the case do not overlap each other when viewed from a top plan view, and
wherein the case includes a plurality of parts, and the pipe supporting manifold member comprises a perforated plate which is disposed to be fitted to a matching plane of the case so as to be substantially aligned with a wall of the case.

2. The brake control system according to claim 1, wherein the pipe supporting manifold member detachably connects a brake pipe disposed inside the case to one of said plurality of brake pipes disposed outside the case.

3. The brake control system according to claim 2, wherein an intake hole is formed in an upper portion of the case, and wherein a breather tube is provided having one end connected to the case in communication with said intake hole, and an opposite end that extends upwardly to an upper portion of the vehicle body, and is arranged to be exposed to the atmosphere.

4. The brake control system according to claim 1, wherein an intake hole is formed in an upper portion of the case, and wherein a breather tube is provided having one end connected to the case in communication with said intake hole, and an opposite end that extends upwardly to an upper portion of the vehicle body, and is arranged to be exposed to the atmosphere.

5. The brake control system according to claim 1, wherein the brake control system further comprises an ABS modulator disposed inside of the case, wherein operation of the ABS modulator is controlled by the electronic control module.

6. A brake control system for a vehicle having a vehicle body comprising a vehicle frame, said brake control system which is configured to be connected to hydraulic brakes through a plurality of brake pipes to control hydraulic pressure of the hydraulic brakes, wherein the brake control system comprises:
a case having a waterproof property;
an electronic control module which is received in the case;
an ABS control module also disposed in the case, wherein operation of the ABS control module is controlled by the electronic control module; and
a pipe-supporting manifold member which is attached to the case, wherein the pipe-supporting manifold member enables the plurality of the brake pipes to be arranged from an external side of the case into the case, wherein the pipe-supporting manifold member and the case are detachably attached to each other through a seal member disposed therebetween;
wherein the pipe-supporting manifold member comprises a perforated plate which is disposed to be fitted to a matching plane of the case so as to be substantially aligned with a case wall;
wherein the case is disposed inside of the vehicle frame above a pair of spaced-apart lower frame pipes interconnected by a lower cross member, and below a pivot shaft that swingably attaches a front end of a rear swing arm, which supports a rear wheel at a rear end of the vehicle, to the vehicle body; and wherein a driveshaft driving the rear wheel is disposed in a part of the rear swing arm disposed at one side in a width direction of the vehicle body, and the case is disposed at an opposite side in the width direction of the vehicle body, such that the driveshaft and the case do not overlap each other when viewed from a top plan view.

7. The brake control system according to claim 6, wherein the pipe-supporting manifold member detachably connects a brake pipe disposed inside the case to a brake pipe disposed outside the case.

8. The brake control system according to claim 6, wherein an intake hole is formed in an upper portion of the case, and wherein a breather tube is provided having one end connected to the case in communication with said intake hole, and an opposite end that extends upwardly to an upper portion of the vehicle body, and is arranged to be exposed to the atmosphere.

* * * * *